Dec. 24, 1929.  E. H. GREIBACH  1,740,456
GRAPHIC INSTRUMENT
Filed Jan. 24, 1928  3 Sheets-Sheet 1
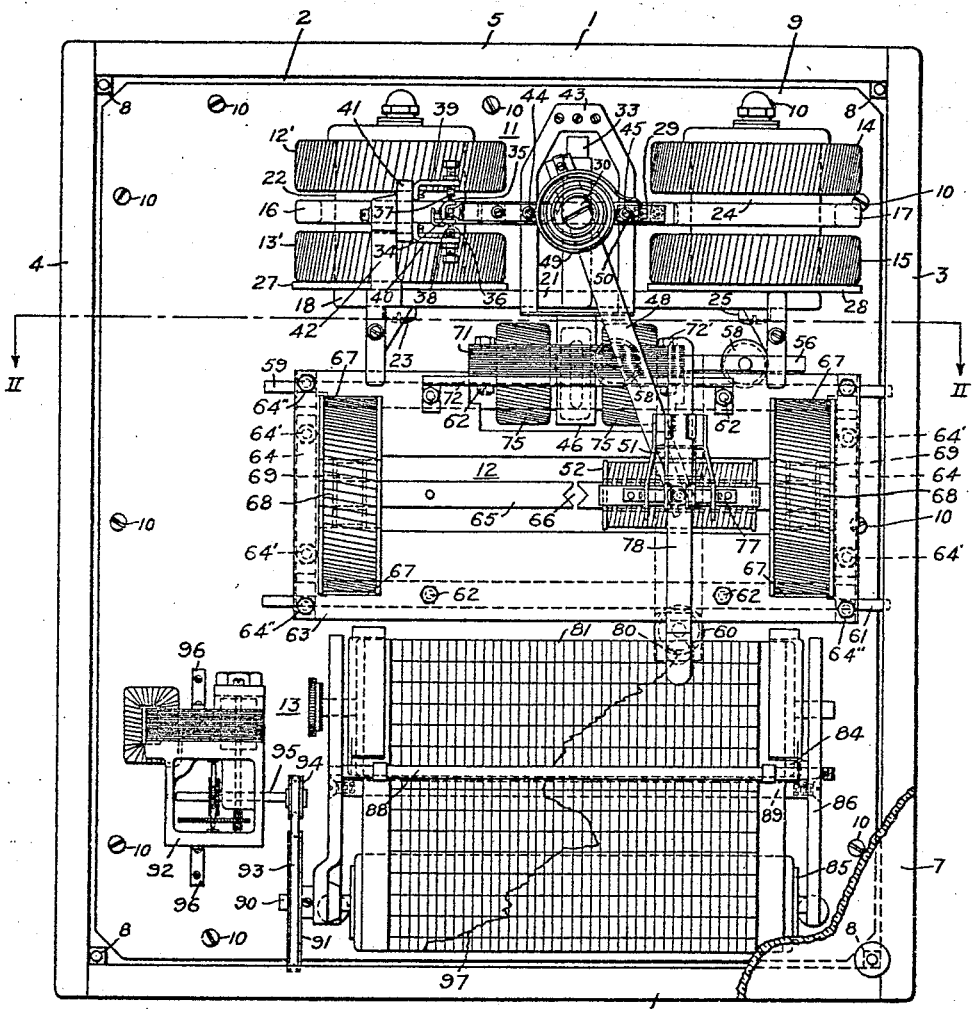
INVENTOR
Emil H. Greibach.
BY
ATTORNEY Dec. 24, 1929.  E. H. GREIBACH  1,740,456
GRAPHIC INSTRUMENT
Filed Jan. 24, 1928   3 Sheets-Sheet 2
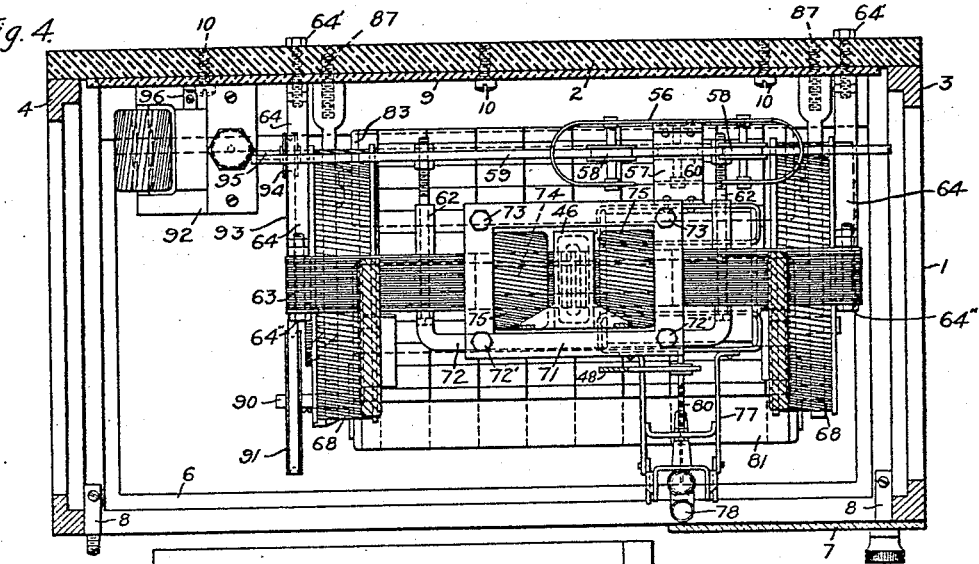
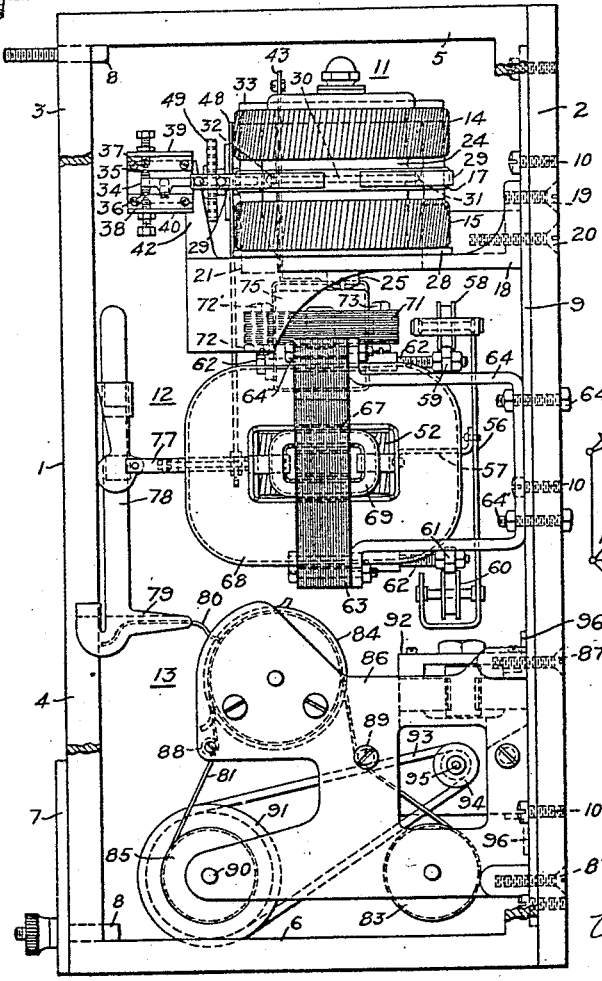
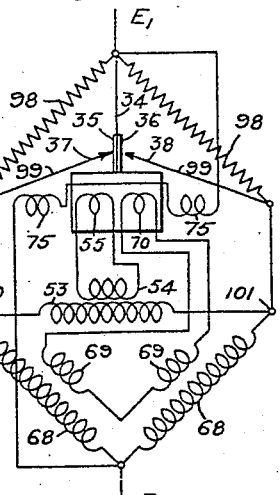
INVENTOR
Emil H. Greibach.
BY
ATTORNEY Dec. 24, 1929.  E. H. GREIBACH  1,740,456
GRAPHIC INSTRUMENT
Filed Jan. 24, 1928   3 Sheets-Sheet 3

INVENTOR
Emil H. Greibach.
BY
ATTORNEY

Patented Dec. 24, 1929

1,740,456

UNITED STATES PATENT OFFICE

EMIL H. GREIBACH, OF PITTSBURGH, PENNSYLVANIA, ASSIGNOR TO WESTINGHOUSE ELECTRIC & MANUFACTURING COMPANY, A CORPORATION OF PENNSYLVANIA

GRAPHIC INSTRUMENT

Application filed January 24, 1928. Serial No. 249,015.

My invention relates to measuring instruments or devices and more particularly to measuring devices for continuously recording the magnitude of a quantity.

An object of my invention is to provide means for magnetically actuating a reciprocatory member in accordance with changes in a characteristic, as magnitude, of some quantity, either electrical or nonelectrical in character.

My invention resides in apparatus of the above-indicated character and comprises, in general, a measuring element, a movable reciprocatory member associated with said measuring element and a recording system for making a continuous record of the position occupied by said horizontally movable member with respect to time.

My invention may be more readily understood if the accompanying drawings are referred to in connection with the following description.

In the drawings,

Figure 1 is a view, in front elevation, of a graphic instrument constructed in accordance with my invention.

Fig. 2 is a simplified circuit diagram for explaining the fundamental conception of operation of the horizontally movable member.

Fig. 3 is a diagram, similar to Fig. 2, showing the mechanical arrangement of the various elements with respect to each other.

Fig. 4 is a view, in cross section, taken on line II—II of Fig. 1.

Fig. 5 is a view, in side elevation, of the device shown in Fig. 1.

Fig. 6 is a view, similar to Fig. 2, with the supplemental corrective currents added thereto and, Fig. 7 is an elementary schematic diagram, useful in explaining the operation of the measuring instrument shown in Fig. 1.

Figure 7:
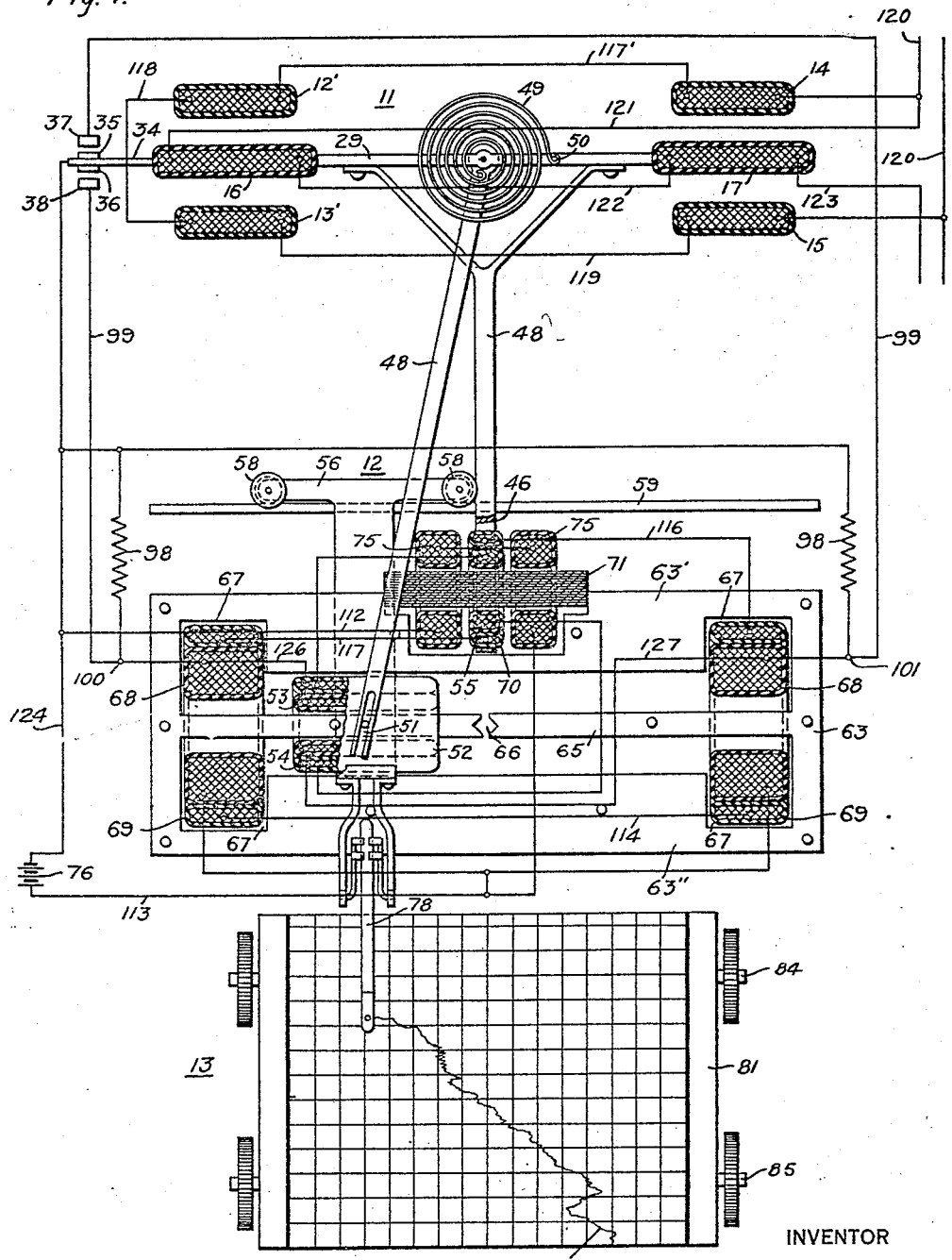

Referring to Figs. 1, 4 and 5, an electrical measuring instrument, constructed in accordance with my invention, is secured within a casing 1 that comprises a base frame 2. The base frame 2 is firmly secured to side frames 3 and 4, an upper frame 5 and a lower frame 6. The rear frame 2 and the side, top and bottom frames are secured together to constitute a unitary structure. The frame 2 is preferably of substantially strong material, such as iron, but the top, bottom and side frames may be made of a lighter material, such as wood. Glass plates, not shown, are mounted in the side frames 3 and 4 and the top and bottom frames 5 and 6 for preventing the passage of dust or other matter to the operating mechanism.

The front of the instrument may be provided with a glass plate 7 that may be retained in position in any suitable manner as, for example, by brackets 8 that are mounted in the corners of the frames. In Fig. 1, the measuring instrument is shown with the front frame entirely removed.

Mounted on the frame 2 is an insulating panel 9, preferably of micarta or slate. The plate 9 may be retained in position by the frame 2 in any suitable manner as, for example, by screws 10 that are preferably uniformly distributed around the peripheral portion of the plate 9. The electrical binding posts (not shown) are mounted on the plate 9. For purposes of clearance of illustration, however, such electrical connections have been omitted from Figs. 1, 4 and 5, which are drawn primarily to show the structural details of the measuring instrument.

An electrical measuring instrument constructed in accordance with my invention, for purposes of explanation, may be assumed as comprising three separate and distinct systems. The first is the measuring element 11, the second comprises the horizontally movable reciprocatory member and its control apparatus, which may be designated the driving system 12, and the third system comprises the recording device 13. The measuring element 11, the driving system 12 and the recording apparatus 13 are all mounted on the panel 9 and the rear frame 2 that, by virtue of its superior strength, holds the relatively heavy apparatus mentioned above, in correct position.

The measuring element 11 may comprise any suitable torque-responsive instrument, but I prefer to use a measuring instrument of the Kelvin-balance type, similar to those utilized in precision meters. A Kelvin-balance instrument is utilizable on alternating or direct current and is suitable for use as a volt meter, a watt meter or an ammeter. I prefer to use an instrument of the Kelvin-balance type both because of its universal applicability and because of its independence of variations in frequency, external field, temperature, power factor and wave form.

The measuring element 11 comprises stationary coils 12', 13', 14 and 15, that are symmetrically disposed, in pairs, about movable coils 16 and 17. The stationary coils 12', 13', 14 and 15 are mounted on a bracket 18 that is secured to the panel 9 by screws 19 and 20. The bracket 18 comprises a shelf portion 21. The stationary coils 12' and 13' encircle the end portions of a magnetizable core 22 that is suitably secured to the shelf 21, as by a bolt 23. In a similar manner, the stationary coils 14 and 15 are provided with a core 24 that is retained in position by a bolt 25, or the like. The coils 13' and 15 are separated from the shelf 21 by insulating plates 27 and 28.

The movable coils 16 and 17 are mounted preferably on a frame 29 that is carried by a shaft 30. The shaft 30, in turn, is pivoted between bearings 31 and 32 retained in a bridge member 33 that constitutes a portion of the shelf 21. The coils 16 and 17 are movable between the air gaps of the pairs of coils 12' and 13' and 14 and 15.

The movable frame 29 is provided with a contact member 34, in turn, provided with an upper contacting portion 35 and a lower contacting portion 36. The contacting portions 35 and 36 respectively cooperate with stationary contact members 37 and 38 that are suitably mounted on brackets 39 and 40 of substantially L-shape. The brackets 39 and 40, in turn, are mounted on a block 41 that is secured to a vertical member 42 constituting a portion of the frame 18. The above mentioned contactors 35 and 37 are adapted to make contact when the frame 29 is turned in a clockwise direction; for such movement of the frame 29, the contactors 36 and 38 are disengaged. When the frame 29, however, is turned counter-clockwise to its extreme position, the contactors 35 and 37 are disengaged and the contact between the contactors 36 and 38 is established, for a purpose that will be more fully set forth hereinafter when the electrical circuits of the instrument are discussed.

The bracket 29 is provided with a frame 43 that is secured thereto on either side of the shaft 30 by screws 44 and 45. The frame 43 is in the form of a yoke and is adapted to carry a coil element 46, which comprises a plurality of windings 55 and 70 that are energized from separate sources, as hereinafter described. The coil element 46, however, is rigidly secured to the bracket 29 and is adapted to move therewith.

An arm 48 is pivoted on an axis that extends into the bridged portion 33 of the frame 18. The arm 48 is free to move about its axis and carries a coil spring 49 that is connected to the armature frame 29 at 50. The arm 48, when turned about its axis, exerts a torque on the frame 29 through the spring 49. The arm 48 is provided with a slot 51 in its lower end portion whereby the arm 48 may be turned to the right or the left in accordance with the longitudinal movement of a reciprocatory member 52. When the reciprocatory member 52 is in one extreme position, i. e., its position of maximum movement; for example, to the right, the spring 49 exerts a maximum torque on the frame 29, tending to turn it in a counter-clockwise direction. The function of the spring 49, in connection with the arm 48 and the frame 29, together with the action of the reciprocatory member 52, will be more fully set forth when the operation of the meter is explained.

Leaving the measuring instrument for the present, I will now describe the driving system 12.

The driving system 12, in conjunction with the measuring instrument 11, defines the essential novelty of my invention and I will now set forth, in some detail, the exact construction of the former.

The reciprocatory member 52 comprises a plurality of windings 53 and 54 wound on the same spool. One of these coils, for example, winding 54, is electrically connected to one of the coils, for example, a winding 55 of the coil element 46, and the other winding 53 is connected to the source of supply, through the contactor mounted on the frame 29, as will be more fully set forth hereinafter. The reciprocatory member 52 is mounted on a carriage 56 by a member 57. The carriage 56 is provided with upper wheels 58 that are adapted to run on a track 59, and a lower guide wheel 60 that coacts with a track 61. Both of the tracks or guide rails 59 and 61 are supported by members 62 extending from a laminated electromagnetic core 63 that is, in turn, mounted on members 64 that are secured, by bolts 64', to the rear frame 2 of the casing. Bolts 64'', that secure the members 64 to the magnet structure 63, also bind together the laminations comprising the magnet structure 63.

The laminated magnet structure 63 is of substantially rectangular shape and is provided with an inner core member 65 extending longitudinally across its central area. The member 65 comprises the inner core for the reciprocatory member 52 and coacts therewith throughout the entire range of movement of the latter. The core member 65 is provided with an opening 66 provided therein for the purpose of decreasing its permeability in connection with improving the operation of the reciprocatory member 52, as will be more fully set forth hereinafter. The magnetizable magnet structure 63 is provided with an opening 67 near each of its end portions for severally admitting a coil 68. The coils 68 are wound and connected to produce magnetic fluxes of like polarity facing each other in the space between the coils 69. The flux emanating from the left hand coil 68 produces a flux that "bucks" the flux set up in the right-hand coil 69.

Mounted on the core member 65, in the area of the coil 68, are auxiliary coils 69 that are connected in series-circuit relation with a winding 70 of the coil element 46, for a purpose that will be set forth in detail in the following description.

Mounted on the upper portion of the magnet structure 63 is an auxiliary magnetic core structure 71. The core 71 is preferably laminated and is securely bound to frame 72 by bolts 72'. The laminations, comprising the core 71, are bound together by the bolts 72' on one side and on the opposite side by bolts 73. The laminated core 71 is in the shape of a hollow rectangle having a central core 74 that is encircled by stationary coils 75. The coils 75 are preferably energized from the control-circuit source of supply 76. The movable coil element 46, comprising windings 55 and 70, embraces the central member 74 of the core 71 and is movable laterally with respect to the coils 75.

A frame 77 extends from the reciprocatory member 52 in which is mounted a marking device 78. The marking device comprises, for example, a pen of the self-feeding type that has a reservoir 79 capable of containing a substantial supply of ink. It operates on the capillary principle, and the pen point 80 is preferably an iridium alloy tube. The reciprocatory member 52 moves the pen 80 in a horizontal plane across the paper 81 at right angles to the motion of the paper. The paper 81 is provided with rectangular coordinates 82, the ordinates of which represent time and the abscissae of which represent the magnitude of the quantity being measured.

The paper 81 is preferably unwound from a supply spool 83 over a roller 84 and upon a receiving spool 85.

The axles of all of the above spools are journalled in a frame 86 that is secured to the base 9 by screws 87.

The paper 81 passes under guide rods 88 and 89 that are secured to the frame 86. The shaft 90 of the spool 85 is provided with a pulley 91 which is driven by a constant-speed device, such as a synchronous motor 92, driving a belt 93. The belt 93 is disposed on the pulley 91, and a pulley 94 that is mounted on shaft 95 of the synchronous motor 92. The synchronous motor 92 is suitably mounted on the base plate 9, as by the brackets 96. As the receiving spool 85 winds up the paper 81, the latter moves under the pen 80, and a line 97 is drawn on the paper 81 that is representative of the magnitude of the quantity being measured by the measuring element 11.

Having set forth, in detail, the mechanical construction of a graphic instrument constructed in accordance with my invention, I will now proceed to outline its electrical circuits and explain its operation.

Neglecting the measuring instrument 11 and the recording arrangement 13 from the discussion, I will describe the driving system 12, the fundamental electrical circuits of which are illustrated in Figs. 2, 3 and 6.

The coils 68 are connected respectively in series-circuit relation with resistors 98, and such series circuits are connected in parallel-circuit relation with the electrical source of potential 76, across which the potentially different points $E_1$ and $E_2$ are connected. The resistors 98 are preferably of equal resistance and are provided with short-circuiting paths 99. The contactor 34 short-circuits either one of the resistors 98 through its short-circuiting path 99, depending upon its direction of rotation.

For example, support that the contactor moves upward in such direction as to short-circuit the left-hand resistor 98. In such case, the difference of potential between $E_1$ and $E_2$ causes a current to traverse the left-hand conductor 99. The current will divide at 100 and a portion will traverse the left-hand coil 68 and a portion will traverse the coil 53 of the right-hand coil 68, as indicated by the solid-line arrows of Fig. 2. If the contactor 34 establishes contact through the left-hand path 99, the current through the coil 53 will be substantially the same, in magnitude, but will be in the opposite direction, as indicated by the dotted-line arrows. The coil 53 establishes a flux in one direction when the contactor 34 operates in one direction and produces a flux in the opposite direction when the contactor 34 operates in the opposite direction. In each instance, the coils 68 are energized to produce a flux in substantially the same direction, and, referring to Fig. 3, such fluxes are designed to buck each other, as hereinbefore mentioned, and as indicated by the arrows.

Referring to Fig. 3, in which a diagrammatic sketch of the instrument described above is shown, a torque is exerted on the arm 29 in such direction as to close either the upper or the lower contacts of the contactor 34. In either case, a circuit is established that energizes the coil 53, that, in turn, sets up a flux which coacts with the "bucking" fluxes emanating from the coil 68 to move the coil 53 in such direction as to wind up the spring 49 to balance the torque on the arm 29 and break the contact established by the contactor 34. The coil 53, in such manner, takes a horizontal position that is indicative of the magnitude of the torque affecting the arm 29.

The above operation set forth in connection with Figs. 2 and 3 comprise the fundamental operation of the reciprocatory member 52. However, such system alone is subject to a disadvantage, i. e., the reciprocatory member 53 does not stop immediately when the arm 29 has been balanced, but moves past such position because of its kinetic energy in moving past such position, causes the contactors to close, and moves the member 53 in the opposite direction which causes the member 52 to move back and forth or oscillate about its correct position. This produces a wavy curve on the paper 81 which is undesirable; it being hard to determine the exact magnitude of the quantity made by such record. I provide means for overcoming this undesirable feature.

To this end, I mount the auxiliary coil 54 on the reciprocatory member 52, together with the coil 53. The coil 54 is connected in electrical series-circuit relation with the auxiliary coil 55 that is mounted on the coil element 46 which moves with the frame 29.

When the reciprocatory member moves the coil 54 through the magnetic lines of force eminating from the coils 68, a voltage is generated therein that is proportional to the speed of the reciprocatory member 52. Such voltage forces a proportional current through the coil 55. Such current sets up a flux that reacts with the flux set up by the coils 75. The coils 75 are connected in parallel-circuit relation across the source of supply 76 for the control circuit by conductors 112 and 113; the coils 75 are wound in such direction that, for a given direction of the current in the coil 70, the latter will be moved in one direction; and for the opposite direction of current in the coil 70, the latter will be moved in an opposite direction. Such action has the effect of turning the frame 29 and breaking the contacts 34 before the reciprocatory member 52 has come to a position at which equilibrium is established between the torque on the springs 49 and the torque produced by the measuring element 11.

Such arrangement for inducing a current in the auxiliary coil 54 and utilizing this current to break the contactors before the reciprocatory member 52 reaches the position indicative of the torque actuating the frame 29, while highly advantageous and desirable from an engineering point of view, in so far as its actual operation is concerned, is subject to a disadvantage also, to wit, when the contactors operate, a rapid establishment of a flux in the coil 53 creates a voltage by magnetic induction in the coil 54. This voltage sends current through the coil 55 that, in turn, builds up a flux that reacts with the flux emanating from the coils 75 and tends to cause the contactors 34 to break immediately.

In order to overcome such disadvantage, I use another auxiliary coil 69 and the magnetic circuit of the coil 53. I decrease the permeability of the coupling between the cords 53 and 54, for example, by cutting slot 66 in the member 65. The flux set up by the coil 53 takes two paths, both of which are included in the cross member 65. One of these paths passes around the upper section 63' of the core 63 and the other path passes around the lower section 63'' of the core 63. In both cases, the flux path traverses the limb 65. The inductive effect incident to the energization of the coil 53 is reduced by the slot 66 in the member 65.

It is well known that air has a much lower permeability than iron, therefore, by providing a path for the flux emanating from the coil 53 through a section 66 of air, I decrease the transformer action of such flux which, as explained above tends to open the contactor 34.

Such desirable corrective effect of the slot 66 is augmented by auxiliary coils 69 that are mounted within the coils 68 as shown in Fig. 1 and similar figures, but which may surround the coils 68, as shown diagrammatically in Fig. 7. The functions of the coils 69 are the same in either case. They are connected in series-circuit relation with each other by a conductor 114 and in series-circuit relation with another auxiliary coil 70 that is mounted, together with the coil 55, on the coil element 46. The coils 69 and the coil 70 are connected in electrical series-circuit relation by conductors 116 and 117. The action of such arrangement is as follows:

When a change in flux of the main energizing circuit takes place, a voltage is set up in the coils 69 which, in turn, forces a current through the coil 70 and establishes a flux that stabilizes the action of the member 46. The effect of the action on the coils 69 is to iron out the inductive "kick" set up in the coil 54 that tends to cause the coil 70 to break the contacts 34. With such arrangement, the reciprocatory member 52 moves rapidly and accurately to substantially the exact position that it should occupy, depending upon the torque actuating the frame 29.

By referring to the schematic diagrams shown in Figs. 6 and 7, the electrical circuit of the instrument may be readily understood. The circuits comprising the measuring instrument 11 may be arranged in any suitable manner, depending upon the characteristic of an electrical quantity the magnitude of which is to be measured. For example, a desirable arrangement for measuring watts would include connecting the stationary coils 12', 13', 14 and 15, in electrical series-circuit relation, by conductors 117', 118 and 119, which circuit would, in turn, be connected in parallel-circuit relation with conductors 120 comprising an electrical power circuit. In such case, if it is desired to measure the power in the circuit 120, the movable coils 16 and 17 are connected in series-circuit relation by conductors 121, 122 and 123, with one of the conductors of the circuit 120.

The control supply circuit for energizing the driving mechanism 12 may be derived from the electrical current source 76 which is connected to the terminals indicated at $E_1$ and $E_2$.

As pointed out in connection with Figs. 2 and 3, the coils 68 are respectively connected in series-circuit relation with the resistors 98 which circuits are, in turn, connected in parallel-circuit relation with respect to the source of potential $E_1$ and $E_2$ by conductors 124 and 125. The coil 53 in a similar manner, is connected, between the junction points 100 and 101 of the resistors 98, with the coils 68 by conductors 126 and 127. The resistors 98 are adapted to be short-circuited by conductors 99, respectively, that are connected to the contacts 38 and 37, as pointed out in connection with Fig. 7.

In operation, assuming that a change in power takes place in the circuit 120, the magnetic reaction between the stationary coils 12′, 13′, 14 and 15, and the movable coils 16 and 17, causes the balance arm 29 to turn in a clockwise or counter-clockwise direction of rotation, depending upon whether such power is increasing or decreasing. In the event that the power is increasing in magnitude, the balance arm 29 moves in a clockwise direction. Upon such a movement, contact is established between the contact points 35 and 37 by the movement of the arm 29. In accordance with the difference in potential between $E_1$ and $E_2$, the voltage of the control supply 76 will send a current around the resistor 98 through the conductor 99, to the junction 100 and the coil 53 will be energized. A magnetic flux is thereby set up by the coil 53. Such flux reacts with the fluxes emanating from the coils 68 and moves the reciprocatory member 52 toward the right. Such movement also turns the arm 48 about its pivot and winds the spring 49 until the torque on the arm 29 is balanced; during this operation, the contact between the members 35 and 37 is broken.

In the meantime, the paper has been moved by synchronous motor 92 at a constant speed, and a record is made thereon of the movement of the member 52 by the pen 80. The auxiliary coils 69 and the slot 66 in the member 65 cooperate to cause the reciprocatory member 52 to be substantially stable in its operation without materially affecting its speed of operation, as hereinbefore set forth. The reciprocatory member 52 always maintains a position indicative of the magnitude of the power in the circuit 120.

In connection with my invention, I wish to particularly point out the fact that it provides a high-speed driving device that is not subject to the disadvantage of overshooting and oscillating.

It will be readily understood that the circuit 120 may be, in turn, connected to a measuring quantity such as a water float or a gas meter, and the latter may be caused to actuate an electrical quantity in the circuit 120 in accordance with its variations.

It will thus be understood that my invention is not limited, in its application, solely to measuring electrical quantities but may be applied to graphically measuring any class or type of measurable quantity.

Various changes and modifications may be made in my invention without departing from the spirit and scope thereof as set forth in the appended claims.

I claim as my invention:

1. The combination with a measuring instrument, of a rectilinearly-movable coil operated by said measuring instrument for performing a control operation.

2. In a graphic recording instrument, the combination with a measuring element and a marker, of means for moving said marker in accordance with the magnitude of a quantity actuating said measuring element including a rectilinearly-movable coil supporting said marker, a laminated core for said coil and means for energizing said core whereby said coil is positioned in accordance with the torque of said measuring instrument.

3. Control mechanism comprising a magnetizable rectilinear structure, a reciprocatory coil embracing a portion of said magnetizable structure, and means for energizing said magnetizable structure whereby said reciprocatory coil moves in accordance with changes in a characteristic of a quantity, said coil being connected in electrical circuit relation with said energizing means.

4. A control system for graphic meters comprising a magnetizable rectilinear core, having parallel openings therein, means for energizing said core, and a reciprocatory coil coacting with said core for performing a control function, said coil embracing the portion of said core between said parallel openings.

5. A control system for graphic meters comprising a magnetizable rectilinear core, means for energizing said core, a reciprocatory coil coacting with said core, said coil embracing a portion of said core, and means associated with said coil including said energizing means for causing it to balance the torque produced in a measuring instrument.

6. An electrical instrument comprising a balance arm, a rectilinearly-movable flux-responsive coil, resilient force-transmitting means connecting said arm and said coil, and flux means for causing said coil to move, when said arm is unbalanced, to a position at which a restoration of balance is effected in said arm.

7. An electrical instrument comprising a balance arm, a magnetically controlled rectilinearly-movable coil, resilient force-transmitting means connecting said arm with said coil, and electromagnetic means for causing said coil to move, when said arm is unbalanced, to a position at which a restoration of balance is effected in said arm.

8. An electrical instrument comprising a balance arm, a reciprocatory rectilinearly-movable flux-responsive member, resilient force-transmitting means connecting said arm with said member, and electromagnetic means including a magnetizable rectilinearly-shaped core for causing said member to move, when said arm is unbalanced, to a position at which a restoration of balance is effected in said arm.

9. A recording instrument comprising a measuring system, a driving system responsive to said measuring system, and a recording system including a marker driven by said driving system, said driving system comprising a flux-responsive reciprocatory coil, a laminated core for said coil, and means for energizing said core and said coil, whereby said coil is positioned in accordance with the torque of said measuring system.

10. A precision recording instrument comprising a measuring system, a driving system responsive to said measuring system, a recording system including a marker driven by said driving system, said driving system comprising a movable flux-responsive reciprocatory member, a laminated magnetizable stationary core coacting with said member and means for energizing said core, said coil being connected in electric circuit relation with said energizing means.

11. A precision recording instrument comprising a Kelvin balance, a driving system responsive to said Kelvin balance, a recorder including a marker driven by said driving system, said driving system comprising a movable reciprocatory coil, a laminated longitudinally extending core for said coil, means for guiding said coil for movement along a substantially lineal path, and means for energizing said core and said coil in accordance with the movement of said Kelvin balance.

12. In a recorder driving system, the combination with a reciprocatory member and a balance contactor for closing an energizing circuit for actuating said member, of means for opening said contactor to break said circuit before said member reaches a position to balance said contactor comprising a coil mounted on said member, and inductive means energized by current induced in said coil.

13. In combination, a source of electrical energy, a plurality of circuits each comprising a resistor and a winding in series circuit relation, said circuits being in parallel circuit relation with said source of energy, a magnetizable core having said windings mounted on the end portions thereof, a laterally movable coil disposed on said core, said coil being connected between said circuits, a measuring instrument comprising a member having means associated therewith for exerting a torque thereon proportional to a measured quantity, resilient means connecting said member and said coil, and means including contactors associated with said member for short-circuiting one or the other of said resistors depending upon the direction of movement of said member.

14. In a graphic meter, the combination with a marker, of means comprising a reciprocatory member for actuating said marker in accordance with a characteristic of quantity, a balance arm, means including a spring connecting said member and said arm, and means for actuating said member comprising an electromagnetic core and coils mounted on said core, said coils and said member being energized when said arm is unbalanced.

15. In a graphic meter, the combination with a marker, of means for actuating said marker in accordance with the characteristic of a quantity comprising a laminated core having an inner cross member, coils mounted on the end portions of said core, a reciprocatory coil encircling said cross member, said marker being mounted on said coil, a balance arm, means including a spring for connecting said arm and said reciprocatory coil, means for turning said arm in accordance with the characteristic of said quantity, means including a contactor associated with said arm and a source of energy for energizing all of said coils for causing relative movement between said reciprocatory coil and said core whereby the arm is restored to balance.

16. In a graphic meter, the combination with a marker, of means comprising an electromagnetic core, and a laterally movable flux-responsive member disposed adjacent said core serving exclusively to actuate said marker.

17. In a graphic meter, the combination with a marker of means for actuating said marker comprising an electromagnetic core, and a laterally movable flux-responsive member disposed adjacent said core, said core comprising a laminated structure having a substantially rectangular periphery and an inner cross-limb encircled by said member.

18. In a combination with a reciprocatory coil, a torque-responsive member, means for creating magnetic fields of opposite polarity on either side of said coil, means for energizing said coil comprising contactors associated with said member, and means for balancing the torque on said member comprising said coil, of means for stopping said coil when said member is balanced comprising an auxiliary coil mounted on said first named coil, another auxiliary coil mounted on said member, said auxiliary coils being connected in electrical circuit relation, and means for creating magnetic fields of opposite polarity on either side of said last named auxiliary coil.

19. In a combination with a reciprocatory coil, a torque-responsive member, means for creating magnetic fields of opposite polarity on either side of said coil, means for energizing said coil comprising contactors associated with said member, and means for balancing the torque on said member comprising said coil, of means for stopping said coil when said member is balanced comprising an auxiliary coil mounted on said member, means for creating magnetic fields of opposite polarity on either side of said auxiliary coil, and means for substantially damping inductive kicks in said auxiliary coil comprising stationary coil, inductively associated with said reciprocatory coil, said last named means also comprising a coil mounted on said auxiliary coil, and electrically connected with said stationary coil.

In testimony whereof, I have hereunto subscribed my name this 17th day of January, 1928.

EMIL H. GREIBACH.